(12) United States Patent
Hong et al.

(10) Patent No.: US 8,179,446 B2
(45) Date of Patent: May 15, 2012

(54) VIDEO STABILIZATION AND REDUCTION OF ROLLING SHUTTER DISTORTION

(75) Inventors: Wei Hong, Richardson, TX (US); Dennis Wei, Cambridge, MA (US); Aziz Umit Batur, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 239 days.

(21) Appl. No.: 12/716,276

(22) Filed: Mar. 3, 2010

(65) Prior Publication Data

US 2011/0176014 A1 Jul. 21, 2011

Related U.S. Application Data

(60) Provisional application No. 61/295,837, filed on Jan. 18, 2010, provisional application No. 61/297,590, filed on Jan. 22, 2010.

(51) Int. Cl.
*G06K 9/32* (2006.01)
*H04N 5/228* (2006.01)

(52) U.S. Cl. ..................... 348/208.6; 382/293

(58) Field of Classification Search ............ 348/208.99, 348/208.1, 208.4, 208.6, 296; 382/276, 278, 382/293–295, 298
See application file for complete search history.

(56) References Cited

U.S. PATENT DOCUMENTS

| 7,119,837 | B2 * | 10/2006 | Soupliotis et al. | ....... 348/208.99 |
| 7,605,845 | B2 | 10/2009 | Batur | |
| 7,773,828 | B2 * | 8/2010 | Sakata et al. | ........... 382/294 |
| 7,924,317 | B2 * | 4/2011 | Lin | ............ 348/208.4 |
| 2009/0066800 | A1 | 3/2009 | Wei | |
| 2009/0213234 | A1 * | 8/2009 | Chen et al. | ........ 348/208.4 |
| 2010/0142778 | A1 * | 6/2010 | Zhuo et al. | ............ 382/128 |
| 2011/0267514 | A1 * | 11/2011 | D'Angelo et al. | ........... 348/296 |

OTHER PUBLICATIONS

C. Geyer, et al., "Geometric Models of Rolling-Shutter Cameras", IEEE Workshop on Omnidirectional Vision, pp. 1-8, 2005.
W.-H. Cho and K.-S. Hong, "Affine Motion Based CMOS Distortion Analysis and CMOS Digital Image Stabilization", IEEE Transactions on Consumer Electronics, vol. 53, issue 3, pp. 833-841, Aug. 2007.
C.-K. Liang, et al., "Analysis and Compensation of Rolling Shutter Effect", IEEE Transactions on Image Processing, pp. 1323-1330, Aug. 2008.
J.-B. Chun, et al., "Suppressing Rolling-Shutter Distortion of CMOS Image Sensors by Motion Vector Detection", IEEE Transactions on Consumer Electronics, pp. 1479-1487, Nov. 2008.
D. Bradley, et al., "Synchronization and Rolling Shutter Compensation for Consumer Video Camera Arrays", International Workshop on Projector-Camera Systems, 2009.

(Continued)

*Primary Examiner* — Timothy J Henn
(74) *Attorney, Agent, or Firm* — Mirna Abyad; W. James Brady; Frederick J. Telecky, Jr.

(57) ABSTRACT

A method of processing a digital video sequence is provided that includes estimating compensated motion parameters and compensated distortion parameters (compensated M/D parameters) of a compensated motion/distortion (M/D) affine transformation for a block of pixels in the digital video sequence, and applying the compensated M/D affine transformation to the block of pixels using the estimated compensated M/D parameters to generate an output block of pixels, wherein translational and rotational jitter in the block of pixels is stabilized in the output block of pixels and distortion due to skew, horizontal scaling, vertical scaling, and wobble in the block of pixels is reduced in the output block of pixels.

18 Claims, 7 Drawing Sheets

OTHER PUBLICATIONS

A. U. Batur and B. Flinchbaugh, "Video Stabilization with Optimized Motion Estimation Resolution", IEEE International Conference on Image Processing, pp. 465-468, Oct. 2006.

A. Litvin, et al., "Probabilistic Video Stabilization Using Kalman Filtering and Mosaicking", Proceedings of IS&T/SPIE Symposium on Electronic Imaging, Image and Video Communications, pp. 663-674, Jan. 20-24, 2003, Santa Clara, CA.

L. Marcenaro, et al., "Image Stabilization Algorithms for Video-Surveillance Applications", IEEE International Conference on Image Processing, pp. 349-352, 2001.

* cited by examiner

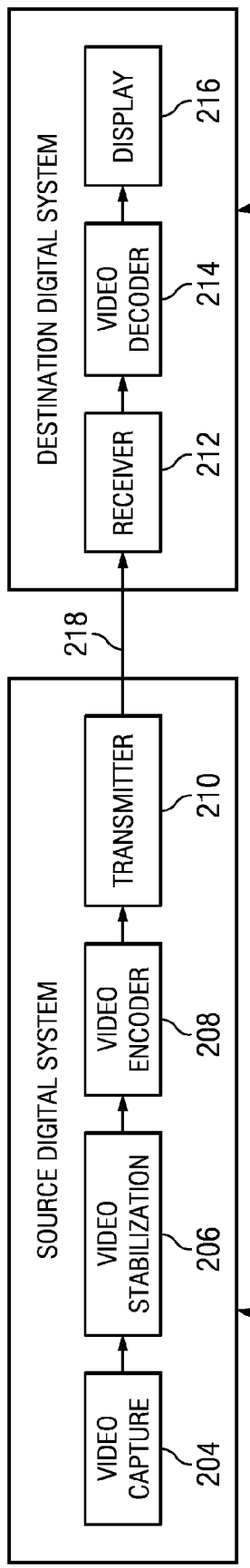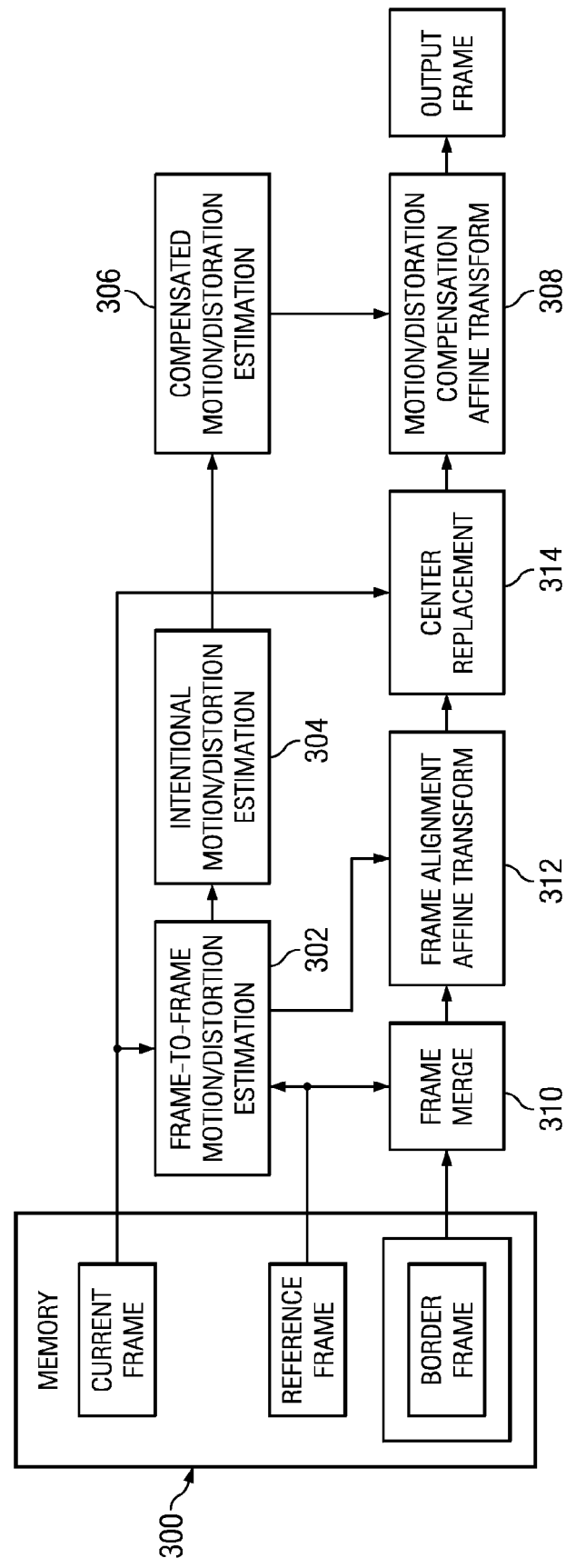

VIDEO STABILIZATION AND REDUCTION OF ROLLING SHUTTER DISTORTION

CROSS-REFERENCE TO RELATED APPLICATIONS

This application claims benefit of U.S. Provisional Patent Application Ser. No. 61/295,837, filed Jan. 18, 2010, and U.S. Provisional Patent Application Ser. No. 61/297,590, filed Jan. 22, 2010, which are incorporated herein by reference in their entirety.

BACKGROUND OF THE INVENTION

An increasing number of video cameras are equipped with CMOS sensors instead of CCD sensors to reduce cost. Most CMOS sensors use rolling shutters that expose scan lines of a frame sequentially, in either top-to-bottom or bottom-to-top order. If the camera or objects in the scene being captured using a CMOS sensor move, distortions due to differences in exposure times, typically referred to as rolling shutter distortions, may be observed. Rolling shutter distortions may include, for example, wobble distortion, skew distortion, and vertical scaling distortion. While rolling shutter distortions caused by local object motion can be very complicated, in general, and especially for hand-held cameras, distortions due to global camera motion are dominant. Accordingly, prior art techniques for reducing rolling shutter distortion typically only consider distortions caused by global camera motion. Examples of prior art techniques are described in the following: C. Geyer, et al., "Geometric Models of Rolling-Shutter Cameras," IEEE Workshop on Omnidirectional Vision, 2005; W.-H. Cho and K.-S. Hong, "Affine Motion Based CMOS Distortion Analysis and CMOS Digital Image Stabilization," IEEE Transactions on Consumer Electronics, vol. 53, issue 3, pp. 833-841, August 2007; C.-K. Liang, et al., "Analysis and Compensation of Rolling Shutter Effect", IEEE Transactions on Image Processing, pp. 1323-1330, August 2008; J.-B. Chun, et al., "Suppressing Rolling-Shutter Distortion of CMOS Image Sensors by Motion Vector Detection," IEEE Transactions on Consumer Electronics, pp. 1479-1487, November 2008; and D. Bradley, et al., "Synchronization and Rolling Shutter Compensation for Consumer Video Camera Arrays," International Workshop on Projector-Camera Systems, 2009.

Global camera motion may be a combination of translational and rotational motion. Many techniques for reducing rolling shutter distortion assume that the global motion is constant between adjacent frames since the intervening time interval is normally small. For hand-held cameras, horizontal camera panning, vertical camera panning, and camera shaking are typical global translational motions. As analyzed in the above cited references, horizontal panning may cause skew distortion, i.e., the frames are bent to one side. Vertical panning results in vertical scaling distortion, i.e., the frames are stretched out or shrunk vertically. Rotational motion may also cause non-linear rolling shutter distortion.

Prior art techniques for reduction rolling shutter distortion, e.g., the above cited references, have considered the compensation of skew and vertical scaling artifacts based on the assumption that the translational motion intended by the user (e.g., panning, zooming, walking toward a subject) can be accurately estimated. But even if the camera is held still and the intentional translational motion is zero, camera shake still results in a type of rolling shutter distortion known as wobble distortion, a combination of oscillations in skew and vertical scaling. More specifically, horizontal shake may cause sudden and alternating skews to the left and right and vertical shake may cause alternating stretching and shrinking in the vertical direction.

BRIEF DESCRIPTION OF THE DRAWINGS

Particular embodiments in accordance with the invention will now be described, by way of example only, and with reference to the accompanying drawings:

FIG. 2 shows a block diagram of a digital system in accordance with one or more embodiments of the invention;

FIG. 3 shows a block diagram of a system for motion/distortion compensation in accordance with one or more embodiments of the invention;

DETAILED DESCRIPTION OF EMBODIMENTS OF THE INVENTION

Figure 1A:
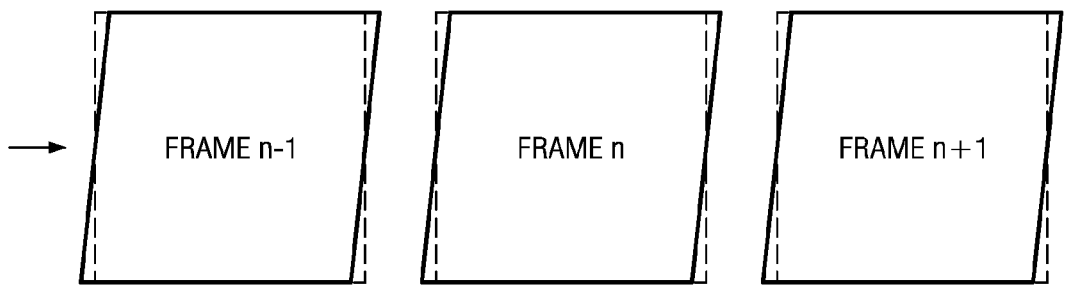
FIG. 1 shows examples of rolling shutter distortions in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless connection. Thus, if a first device or component couples to a second device or component, that connection may be through a direct connection, through an indirect connection via other devices and connections, through an optical connection, and/or through a wireless connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, combined, and/or performed in a different order than the order shown in the figures and/or described herein. Accordingly, embodiments of the invention should not be considered limited to the specific ordering of steps shown in the figures and/or described herein.

In the following description, a top-to-bottom scan order is assumed. However, one of ordinary skill in the art will understand embodiments of the invention in which other scan orders, e.g., bottom-to-top, are used. Accordingly, embodiments of the invention should not be considered limited to a particular scan order. Further, while the portions of a video sequence being processed are referred to as frames herein, one of ordinary skill in the art will understand embodiments of the invention in which the processed portions of the video sequence are blocks of pixels such as a picture, a subset of a frame, a subset of a picture, etc.

Figure 1B:
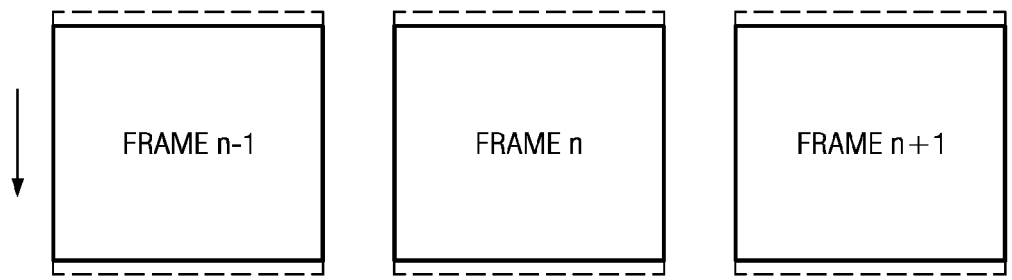
Figure 1C:
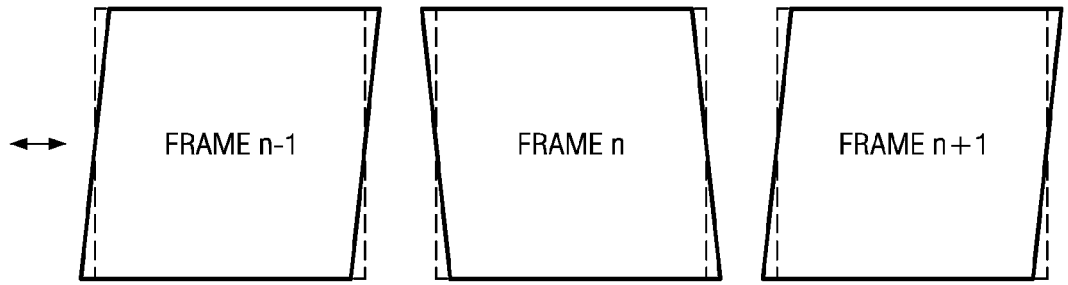
Figure 1D:
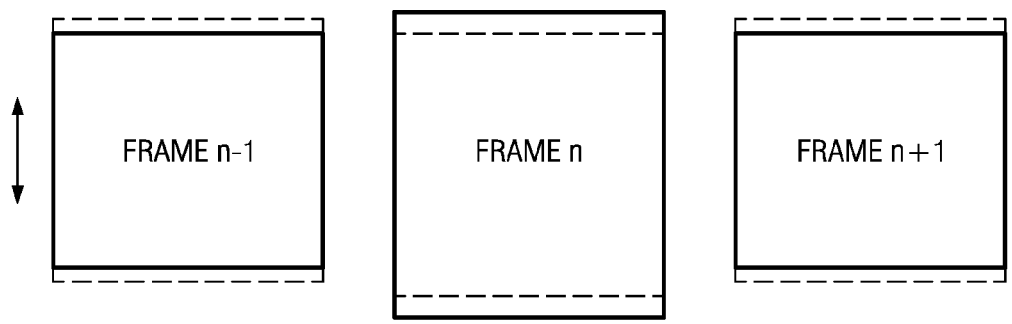

In general, embodiments of the invention provide methods and systems for video stabilization and reduction of rolling shutter distortion in digital systems that capture digital video sequences. In embodiments of the invention, rolling shutter distortions, including wobble, skew, and vertical scaling distortions, are reduced and both translational and rotational jitter are corrected by estimating the parameters of a model describing the transformation between two frames (which may be consecutive) of a video sequence and performing compensating transformations based on those estimates. FIGS. 1A-1D show examples of some rolling shutter distortions that may be introduced by global camera motion that are addressed by embodiments of the invention. In these figures, the arrows illustrate the direction of the global camera motion. Specifically, FIG. 1A illustrates horizontal motion between frames, FIG. 1B illustrates vertical motion between frames, FIG. 1C illustrates horizontal jitter between frames, and FIG. 1D illustrates vertical jitter between frames.

Embodiments of the systems and methods for video stabilization and reduction of rolling shutter distortion are based on a six-parameter affine model that describes the transformation between two frames (which may be consecutive) of a video sequence. Unlike the prior art affine model used in W.-H. Cho and K.-S. Hong, "Affine Motion Based CMOS Distortion Analysis and CMOS Digital Image Stabilization," IEEE Transactions on Consumer Electronics, vol. 53, issue 3, pp. 833-841, August 2007 ("Cho"), the affine model described herein includes parameters explicitly associated with skew and vertical scaling transformations. As is described in more detail herein, closed-form estimates of the six parameters may be calculated from motion vectors for a set of features selected based on certain criteria to avoid ambiguities. Wobble distortions, which are regarded as jitter in the skew and scaling parameters of the model, may then be corrected as part of stabilization of translational and rotational jitter, i.e., video stabilization, with little additional computation. Thus, the model provides a unified framework for the reduction of rolling shutter distortions including wobble together with stabilization of translational and rotational jitter, i.e., video stabilization. None of the prior art references cited above provide correction for wobble distortion.

In addition, in one or more embodiments of the invention, an adaptive IIR (infinite impulse response) filter is used to estimate the component of the transformations that is intentional. The strength of the IIR filter is controlled by the magnitudes of the intentional transformations, e.g., zooming, panning, walking toward the subject, in such a way that the estimates can follow the true intentional transformations more closely. Further, while prior art video stabilization methods crop the output frames to hide invalid regions, in one or more embodiments of the invention, information from aligned reference frames is used to fill invalid regions to produce full-size output frames.

FIG. 2 shows a block diagram of a digital system in accordance with one or more embodiments of the invention. The digital system is configured to perform video stabilization and rolling shutter motion distortion reduction, i.e., motion/distortion (M/D) compensation, on digital video sequences. The system includes a source digital system (200) that transmits encoded video sequences to a destination digital system (202) via a communication channel (218). The source digital system (200) includes a video capture component (204), a video stabilization component (206), a video encoder component (208) and a transmitter component (210). The video capture component (204) is configured to provide a video sequence to be stabilized by the video stabilization component (206) prior to encoding by the video encoder component (208). The video capture component (204) may be for example, an imaging sensor, a video camera, a video archive, or a video feed from a video content provider. In some embodiments of the invention, the video capture component (204) may generate computer graphics as the video sequence, or a combination of live video and computer-generated video.

The video stabilization component (206) receives a video sequence from the video capture component and performs an embodiment of a method for motion/distortion (M/D) compensation as described herein on the frames of the video sequence to generate an M/D compensated video sequence. In some embodiments of the invention, the video stabilization component (206) may include functionality/components as described in reference to FIG. 3 below.

The video encoder component (208) receives an M/D compensated video sequence from the video stabilization component (206) and encodes it for transmission by the transmitter component (210). In general, the video stabilization component (208) receives the compensated video sequence from the video capture component (204) as a sequence of frames, divides the frames into coding units which may be a whole frame or a part of a frame, divides the coding units into blocks of pixels, and encodes the video data in the coding units based on these blocks.

The transmitter component (210) transmits the encoded video data to the destination digital system (202) via the communication channel (218). The communication channel (218) may be any communication medium, or combination of communication media suitable for transmission of the encoded video sequence, such as, for example, wired or wireless communication media, a local area network, or a wide area network.

The destination digital system (202) includes a receiver component (212), a video decoder component (214) and a display component (216). The receiver component (212) receives the encoded video data from the source digital system (200) via the communication channel (218) and provides the encoded video data to the video decoder component (214) for decoding. In general, the video decoder component (214) reverses the encoding process performed by the video encoder component (208) to reconstruct the frames of the video sequence. The reconstructed video sequence may then be displayed on the display component (216). The display component (216) may be any suitable display device such as, for example, a plasma display, a liquid crystal display (LCD), a light emitting diode (LED) display, etc.

In some embodiments of the invention, the source digital system (200) may also include a receiver component and a video decoder component and/or the destination digital system (202) may include a transmitter component and a video encoder component for transmission of video sequences in both directions for video streaming, video broadcasting, and video telephony. Further, the video encoder component (208) and the video decoder component (214) may perform encoding and decoding in accordance with one or more video compression standards such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), etc. The video stabilization component (206), the video encoder component (208) and the video decoder component (214) may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

FIG. 3 shows a block diagram of a system for motion/distortion (M/D) compensation of digital video sequences in accordance with one or more embodiments of the invention. In general, an M/D compensation affine transform is applied to frames of the video sequence to reduce distortion introduced by unintentional motion and the use of an imaging sensor with a rolling shutter when the video sequence was captured. The M/D compensation affine transform models the transformation between two frames (which may be consecutive) in a video sequence and is developed as described below.

When the digital system (e.g., a digital video camera or cellular telephone) used to capture a video sequence is subject to horizontal motion, the skew between a current frame and a reference frame, i.e., a prior frame in the video sequence which may be the immediately previous frame, can be modeled as $$\vec{x}' = A_k \vec{x} = \begin{bmatrix} 1 & k \\ 0 & 1 \end{bmatrix} \vec{x} \qquad (1)$$

where $\vec{x}' = [x' \; y']^T$ are the coordinates of a pixel in the current frame, $\vec{x} = [x \; y]^T$ are the coordinates in the reference frame, and k is a parameter describing the degree of skew. A positive k indicates skew to the left and a negative k indicates skew to the right. The origin of the coordinate system is in the center of the frame.

When the digital system is subject to vertical motion (e.g., vertical panning), vertical scaling distortion occurs, e.g., the frames may be compressed or stretched vertically. Zooming can also be modeled as scaling in both the horizontal and vertical directions. So the overall scaling transform can be modeled as $$\vec{x}' = A_s \vec{x} = \begin{bmatrix} S_x & 0 \\ 0 & S_y \end{bmatrix} \vec{x} \qquad (2)$$

where $S_x$ and $S_y$ are scaling factors in the horizontal and vertical directions respectively. Note that wobble distortion can be deemed as a combination of sudden skew and vertical scaling. Thus, wobble distortion is taken into account by the skew factor k and scaling factors $S_x$ and $S_y$. Further, the translational and rotational motion between the current frame and the reference frame can be modeled by a three-parameter affine transformation $$\vec{x}' = A_r \vec{x} + \vec{d} = \begin{bmatrix} \cos\theta & -\sin\theta \\ \sin\theta & \cos\theta \end{bmatrix} \vec{x} + \begin{bmatrix} d_x \\ d_y \end{bmatrix} \qquad (3)$$

where $\theta$ is the angle of rotation and $\vec{d} = [d_x \; d_y]^T$ is the translation vector.

The combination of the above transformations between the current frame and the reference frame, i.e., Eq. (1), Eq. (2), and Eq. (3), can be modeled as an affine transformation $\vec{x}' = A\vec{x} + \vec{d}$. Because these transformations are relatively small, the order of the matrices $A_k$, $A_s$, $A_r$ does not matter. Also, because the rotation angle $\theta$ is very small, $\sin\theta$ can be approximated as $\theta$ and $\cos\theta$ can be approximated as 1. Further, $S_x$ and $S_y$ have values close to 1 and can be expressed as $1+s_x$ and $1+s_y$, where $s_x$ and $s_y$ are small. The skew factor k is also small. Based on these approximations, the combined transformation matrix A can be simplified to $$A = A_r A_s A_k \qquad (4)$$

$$= \begin{bmatrix} 1 & -\theta \\ \theta & 1 \end{bmatrix} \begin{bmatrix} 1+s_x & 0 \\ 0 & 1+s_y \end{bmatrix} \begin{bmatrix} 1 & k \\ 0 & 1 \end{bmatrix} \approx \begin{bmatrix} 1+s_x & -\theta+k \\ \theta & 1+s_y \end{bmatrix}$$

In summary, the transformation between the current frame and the reference frame is described by the following six-parameter affine model, i.e., the M/D compensation affine transform, $$\vec{x}' = A\vec{x} + \vec{d} = \begin{bmatrix} 1+s_x & -\theta+k \\ \theta & 1+s_y \end{bmatrix} \vec{x} + \begin{bmatrix} d_x \\ d_y \end{bmatrix} \qquad (5)$$

where $d_x$, $d_y$, and $\theta$ are motion parameters and $s_x$, $s_y$, and k are distortion parameters, referred to collectively herein as the motion/distortion (M/D) parameters. In this affine model, as compared to the model described in Cho, the six parameters have clear physical meanings, thus permitting each of the motion or distortion parameters to be accurately estimated and manipulated without interfering with the other parameters.

The components of the system of FIG. 3 estimate compensated M/D parameters for a current frame based on motion between the current frame and a reference frame, and then apply the M/D compensation affine transformation to the current frame using the estimated compensated M/D parameters to generate an M/D compensated output frame. As shown in FIG. 3, the current frame, the reference frame, and a border frame are stored in memory (300). In one or more embodiments of the invention, the reference frame is the frame that immediately preceded the current frame in the video sequence. The border frame is explained below.

The frame-to-frame motion/distortion estimation component (302) includes functionality to compute estimates of the motion and distortion between the current frame and the reference frame. More specifically, the frame-to-frame M/D estimation component (302) computes estimates of a frame-to-frame M/D parameter vector $$\vec{p} = [d_x \, d_y \, \theta \, s_x \, s_y \, k]^T$$

To estimate the parameter vector, Eq. (5) is rewritten as $$\underbrace{\begin{bmatrix} 1 & 0 & -y & x & 0 & y \\ 0 & 1 & x & 0 & y & 0 \end{bmatrix}}_{M} \underbrace{\begin{bmatrix} d_x \\ d_y \\ \theta \\ s_x \\ s_y \\ k \end{bmatrix}}_{\vec{p}} = \underbrace{\begin{bmatrix} x' - x \\ y' - y \end{bmatrix}}_{\vec{v}} \qquad (6)$$

A set of features at positions $\vec{x}_i$ in the reference frame are selected and their corresponding motion vectors $\vec{v}_i$ are computed to solve Eq. (6). Any suitable technique for selecting features and/or computing the motion vectors of the features may be used.

Figure 4A:
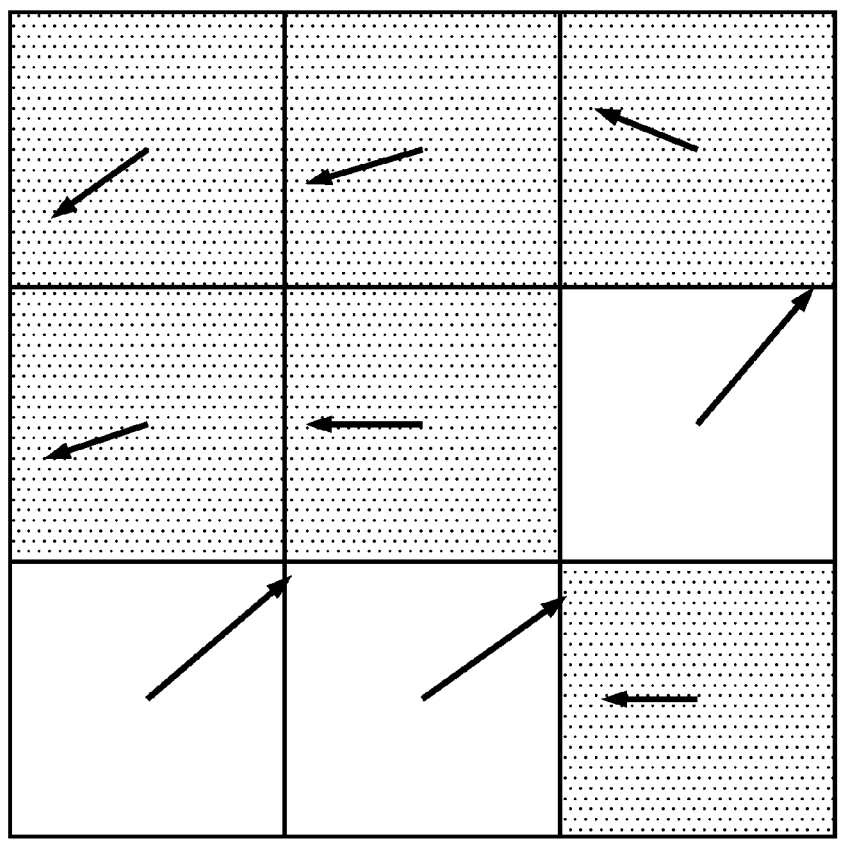
FIGS. 4A and 4B show examples in accordance with one or more embodiments of the invention.

In one or more embodiments of the invention, the following procedure is used to select features and estimate their motion. Initially, a global translational motion vector is estimated since the amplitude of the global translational motion is typically much larger than the amplitudes of the rotational motion and other distortions. In some embodiments of the invention, a technique similar to the one described in. A. U. Batur and B. Flinchbaugh, "Video Stabilization With Optimized Motion Estimation Resolution," IEEE International Conference on Image Processing, pp. 465-468, October 2006 is used to compute the global translational motion vector. More specifically, the current frame is divided into a 3×3 grid of nine (9) rectangular regions as shown in the example of FIG. 4A. Hierarchical motion estimation is performed for each region using Sum of Absolute Differences (SAD) based motion estimation. The motion vectors for the nine regions are then grouped into clusters based on similarity. The cluster that has the smallest temporally low-pass filtered motion vector is selected. The average motion vector of the selected cluster is chosen as the global translational motion vector for the frame.

Figure 4B:
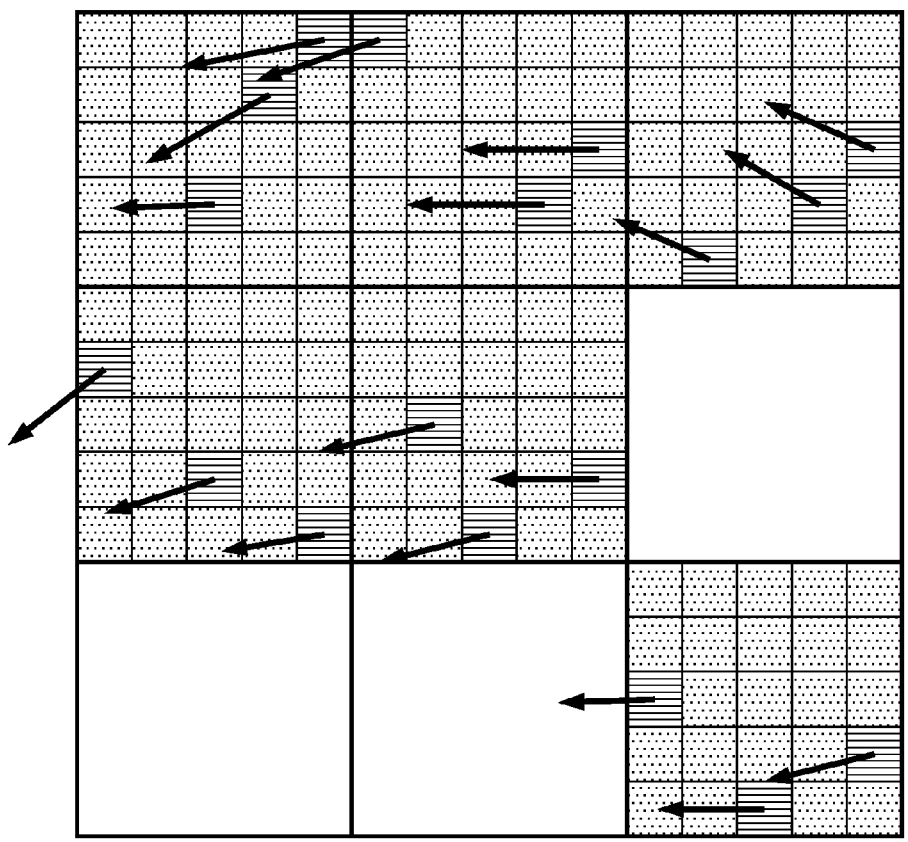

After the global translational motion vector is computed, a small set of features, shown as dark blocks in the example of FIG. 4B, are selected from the cluster used to compute the global translational motion vector for the purposes of more accurate and computationally intensive motion estimation. Each region in the cluster is subdivided into a 5×5 array of smaller rectangular blocks, i.e., features. A subset of these features is then chosen for computation of motion vectors. The goal is to choose features that are dissimilar to their surroundings in order to obtain more accurate motion vectors.

Toward this end, horizontal and vertical projection vectors are computed for each feature and for the surrounding region in the current frame. SADs between the projection vectors corresponding to the feature and to its surrounding region are computed for a range of displacements, resulting in two SAD profiles (horizontal and vertical) that characterize how similar a feature is to its neighborhood. Each feature is assigned a score based on three criteria: the depths of the primary troughs centered on zero displacement in its SAD profiles (by definition, the SAD at zero displacement is zero), the depths of any secondary troughs, which indicate nearby features that may be confused with the feature being considered, and the distance to the center of the frame, given that features farther from the center allow for more reliable estimation of rotation, scaling, and skew. The three best features according to these criteria are selected from each region in the cluster.

Finally, the translational motion vectors of the selected features are estimated using a conventional block-matching method. Each feature in the current frame is matched against features in the reference frame located within a range of displacements centered on the global translational motion vector. The displacement resulting in the smallest SAD is taken to be the motion vector $\vec{v}_i$ of the feature at $\vec{x}'_i$ in the current frame. The position of each matched feature in the reference frame is therefore $\vec{x}_i = \vec{x}'_i - \vec{v}_i$.

In some embodiments of the invention, at least three pairs of $\vec{x}_i$ and $\vec{v}_i$ corresponding to three features are required to compute a solution to Eq. (6). If there are more than three features, Eq. (6) is over-determined. Since the matrix M is sparse, a least-squares estimate of the frame-to-frame M/D parameter vector $\vec{p}$ can be determined efficiently in closed form.

Referring again to FIG. 3, the intentional motion/distortion estimation component (304) includes functionality to compute estimates of the intentional motion and distortion between the current frame and the reference frame. These estimates represent the translational and/or rotational motion intended by the user when capturing the video sequence. Video stabilization involves removing jitter from the translational and/or rotational motion while preserving the intended motion. More specifically, the intentional motion/distortion estimation component (304) computes estimates of a frame-to-frame intentional M/D parameter vector $$\vec{p}^I = [d_x^I d_y^I \theta^I s_x^I s_y^I k^I]^T \tag{7a}$$

In some embodiments of the invention, the low-pass component of the transformations is regarded as intentional and the high-pass component as jitter. A filter such as, for example, a FIR filter, a Kalman filter, a spline filter, or an IIR (infinite impulse response) filter may be applied to reduce jitter. In one or more embodiments of the invention, the intentional M/D estimation component (304) initially computes estimates of a low pass frame-to-frame M/D parameter vector $$\vec{p}^L = [d_x^L d_y^L \theta^L s_x^L s_y^L k^L]^T \tag{7b}$$

using an IIR low-pass filter. The computed vector $\vec{p}^L$ is subsequently used to compute $\vec{p}^I$. More specifically, a low-pass M/D parameter vector $\vec{p}^L$ is computed from the frame-to-frame M/D parameter vectors for the current frame and the reference frame as $$\vec{p}^L[n] = \vec{\alpha} \cdot \vec{p}^L[n-1] + (\vec{1} - \vec{\alpha}) \cdot \vec{p}[n] \tag{8}$$

where $\vec{\alpha}$ is a vector of damping factors between 0 and 1 for each component in $\vec{p}$, $\vec{1}$ is a vector of ones, n is the frame number, and the multiplications are done component-wise. Any suitable vector of damping factors may be used. The vector of damping factors may be user-supplied and/or determined empirically. In one or more embodiments of the invention, the parameter values of $\vec{p}^L$ for the initial frame in the video sequence are all zero.

Finding a set of damping factors $\vec{\alpha}$ that works well for all cases is difficult. If the damping factors are too small, the jitter will not be sufficiently reduced. Further, if there are significant intentional transformations and the damping factors are too close to 1, there will be a long delay between the estimated and the true values. Accordingly, in one or more embodiments of the invention, the damping factors are adapted to the magnitudes of the intentional transformation parameters. The adaptive damping vector $\vec{\beta}[n]$ is computed as $$\vec{\beta}[n] = \max(\vec{\beta}_0 - \vec{\rho} |\vec{p}^L[n]|, 0) \tag{9}$$

where $\vec{\beta}_0$ is a vector representing the maximum damping factor values and $\vec{\rho}$ is a vector of user-specified parameters that control the strength of the adaptation. The idea behind the adaptation is to reduce the damping factors when the intentional transformations are large so that the estimates can follow the true transformations more quickly. The larger the values in the strength vector $\vec{\rho}$ the more sensitive the adaptation.

Estimates of the intentional M/D parameter vector $\vec{p}^I$ for the current frame are then computed as $$\vec{p}^I[n] = \vec{\beta}[n] \cdot \vec{p}^I[n-1] + (\vec{1} - \vec{\beta}[n]) \cdot \vec{p}[n] \tag{10}$$

with $\vec{\beta}[n]$ determined according to Eq. (9). In one or more embodiments of the invention, the parameter values of $\vec{p}^I$ for the initial frame in the video sequence are all zero.

Referring again to FIG. 3, the compensated motion/distortion estimation component (306) includes functionality to compute estimates of the motion and distortion between the current frame and the reference frame that compensate for jitter in the estimated transformation parameters, i.e., the frame-to-frame M/D parameter vector $\vec{p}$. As previously mentioned, video stabilization involves removing jitter from the translational and/or rotational motion while preserving the intended motion. In addition, removing wobble distortion involves removing jitter from the skew and scaling parameters. Accordingly, video stabilization and reduction of distortion due to wobble can be accomplished by removing jitter from the estimated motion parameters and distortion parameters. More specifically, the compensated motion/distortion estimation component (306) computes estimates of a compensated M/D parameter vector $$\vec{p}^c = [d_x^c\, d_y^c\, \theta^c\, s_x^c\, s_y^c\, k^c]^T$$

using the intentional M/D parameter vector $\vec{p}^I$ and the frame-to-frame M/D parameter vector $\vec{p}$.

To compute $\vec{p}^c$, estimates of the wobble distortion and motion jitter in the current frame, i.e., a wobble compensation parameter vector $\vec{p}^w$ representing wobble distortion and motion jitter between the current frame and the reference frame, are computed as $$\vec{p}^w[n] = \vec{p}^w[n-1] + \vec{p}[n] - \vec{p}^I[n] \qquad (11)$$

In one or more embodiments of the invention, the parameter values of $\vec{p}^w$ for the initial frame in the video sequence are all zero.

In addition, estimates of the skew and vertical scaling distortions in the current frame caused by intentional motion i.e., a distortion compensation parameter vector $\vec{p}^d$ representing skew distortion and vertical scaling distortion between the current frame and the reference frame, are computed. The skew distortion is proportional to the horizontal intentional motion. Accordingly, the addition to the skew compensation parameter can be calculated as $\lambda_x d_x^I$, where $\lambda_x$ is a parameter describing the strength of the skew compensation. Similarly, the vertical scaling distortion is proportional to the vertical intentional motion, and the addition to the vertical scaling compensation can be expressed as $\lambda_y D_y^I$ where $\lambda_y$ is another strength parameter. The strength parameters $\lambda_x$ and $\lambda_y$ may be, for example, determined empirically or derived from the scanning speed of the rolling shutter. Thus the distortion compensation parameter vector $\vec{p}^d$ for skew and vertical scaling distortions is computed as $$\vec{p}^d = [0\, 0\, 0\, 0\, \lambda_y d_y^I\, \lambda_x d_x^I] \qquad (12)$$

The compensated M/D parameter vector $\vec{p}^c$ is then computed as the sum of the wobble compensation parameter vector $\vec{p}^w$ and the distortion compensation parameter vector $\vec{p}^d$ $$\vec{p}^c[n] = \vec{p}^w[n] + \vec{p}^d[n] \qquad (13)$$

Referring again to FIG. 3, the motion/distortion compensation affine transform component (308) includes functionality to perform an affine transformation similar to that of Eq. (5) on an augmented version of the current frame using the compensated M/D parameter vector $\vec{p}^c$ to generate an M/D compensated output frame. Generation of the augmented current frame is described below. The value of a pixel located at (x, y) in the output frame is taken from a location (x', y') in the augmented current frame computed as $$\begin{bmatrix} x' \\ y' \end{bmatrix} = \begin{bmatrix} 1+s_x^c & -\theta^c + k^c \\ \theta^c & 1+s_y^c \end{bmatrix} \begin{bmatrix} x \\ y \end{bmatrix} + \begin{bmatrix} d_x^c \\ d_y^c \end{bmatrix} \qquad (14)$$

Application of the affine transformation to the current frame (without augmentation) may generate some pixel locations that are outside the boundaries of the current frame. Accordingly, the current frame is augmented with a border frame as described below to accommodate such pixel locations. In one or more embodiments of the invention, the dimensions of the augmented current frame are increased by 10% on a side over the dimensions of the current frame.

The frame merge component (310), the frame alignment affine transform component (312), and the center replacement component (314) operate together to generate the augmented current frame used by the M/D compensation affine transform component (308). An augmented current frame is the current frame with a border of pixels added, i.e., a border frame, to accommodate the pixel locations computed by the affine transform that fall outside the boundaries of the current frame.

The frame merge component (310) includes functionality to merge the reference frame and the border frame to generate an augmented reference frame. The creation of the border frame is described in relation to the center replacement component (314). Note that the border frame is sized such that the reference frame fits exactly in the center of the border frame. Further, in some embodiments of the invention, the border frame includes only pixels that fall outside of the boundaries of the reference frame.

The frame alignment affine transform (312) includes functionality to apply a frame alignment affine transformation to the pixels of the augmented reference frame to align the augmented reference frame with the current frame to generate an aligned augmented reference frame. The alignment affine transformation is given by $$\begin{bmatrix} x' \\ y' \end{bmatrix} = \begin{bmatrix} 1-s_x^c & \theta^c - k^c \\ -\theta^c & 1-s_y^c \end{bmatrix} \begin{bmatrix} x \\ y \end{bmatrix} - \begin{bmatrix} d_x^c \\ d_y^c \end{bmatrix} \qquad (15)$$

where the parameter values used are those of the frame-to-frame M/D parameter vector $\vec{p}$ from the frame-to-frame M/D estimation component (302).

The center replacement component (314) includes functionality to replace a center portion of the aligned augmented reference frame of the same size as the current frame with the current frame to generate an augmented current frame. The border portion of the augmented current frame, i.e., the portion of the augmented current frame outside the boundaries of the current frame, is stored back into the memory (300) as the border frame for the next frame in the video sequence. In one or more embodiments of the invention, the border frame for the first frame in the video sequence is set to all gray pixels. In essence, as the system processes a video sequence, a current frame is mosaicked with the cumulative border information from the previously processed frames to generate an augmented current frame.

Figure 5:
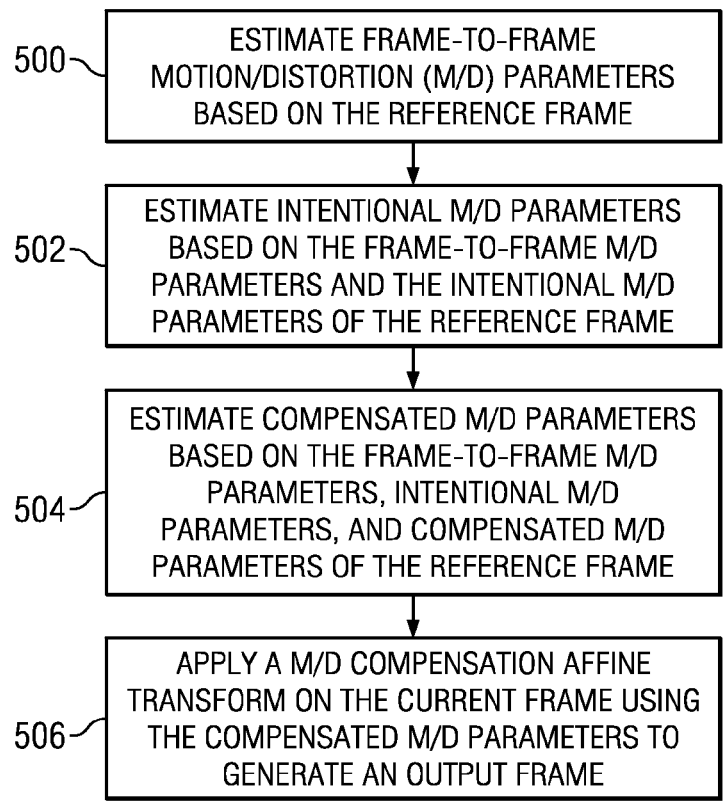
FIGS. 5 and 6 show flow graphs of methods in accordance with one or more embodiments of the invention.

FIG. 5 is a flow graph of a method for motion/distortion (M/D) compensation in a digital video sequence in accordance with one or more embodiments of the invention. In general, embodiments of the method apply an M/D compensation affine transformation as previously described to frames of the video sequence to reduce distortion introduced by unintentional motion and the use of an imaging sensor with a rolling shutter when the video sequence was captured.

As shown in FIG. 5, initially frame-to-frame M/D parameters for a current frame are estimated based on a reference frame (500). In one or more embodiments of the invention, the reference frame is the frame that immediately precedes the current frame in the video sequence. More specifically, estimates of a frame-to-frame M/D parameter vector $\vec{p}$ are computed as previously described.

Once the frame-to-frame M/D parameter vector $\vec{p}$ is computed, intentional M/D parameters are estimated based on $\vec{p}$ and intentional M/D parameters previously computed for the reference frame (502). More specifically, estimates of a frame-to-frame intentional M/D parameter vector $\vec{p}^I$ are computed. As was previously described, these estimates may be computed based on a low pass frame-to-frame M/D parameter vector $\vec{p}^L$ generated using an IIR low-pass filter and the intentional M/D parameter vector previously computed for the reference frame. In one or more embodiments of the invention, the IIR low-pass filter is an adaptive filter as described above.

Compensated M/D parameters are then estimated based on $\vec{p}$, $\vec{p}^I$, and the compensated M/D parameters previously computed for the reference frame (504). More specifically, estimates of a compensated M/D parameter vector $\vec{p}^c$ are computed. As was previously described, these estimates may be computed from a wobble compensation parameter vector $\vec{p}^w$ and a distortion compensation parameter vector $\vec{p}^d$. The latter two parameter vectors may be computed as described above.

Finally, the M/D compensation affine transformation is applied to the pixels of the current frame using $\vec{p}^c$ to generate an M/D compensated output frame (506). The value of a pixel located at (x, y) in the output frame may be computed from a location (x', y') in the current frame as previously described.

Application of the affine transform to the current frame may generate some pixel locations that are outside the boundaries of the current frame. In such cases, the generated output frame will have some invalid regions at the boundaries. In one or more embodiments of the invention, the generated output frame is cropped to produce a smaller output frame without invalid regions. After the affine transform is applied, some of the computed pixel coordinates may be non-integer. Accordingly, an interpolation operation such as bi-linear or bi-cubic interpolation is used to interpolate the current frame to get pixels values from non-integer locations.

In one or more embodiments of the invention, to produce an output frame of the same size as the current frame, i.e., to avoid the need to crop the generated output frame, a frame mosaicking technique is used to augment, i.e., increase the size of, the current frame prior to application of the affine transform. More specifically, the current frame is augmented with a border frame of pixels prior to application of the affine transformation. In general, the border frame should increase the size of the current frame so as to eliminate most of what would have been invalid regions in an output frame generated using the unaugmented current frame. In some embodiments of the invention, the border frame is sized such that the dimensions of the augmented current frame are increased by 10% on each side. Further, in some embodiments of the invention, the border frame should include some of the information that fell outside the frame boundaries of previously processed frames.

Figure 6:
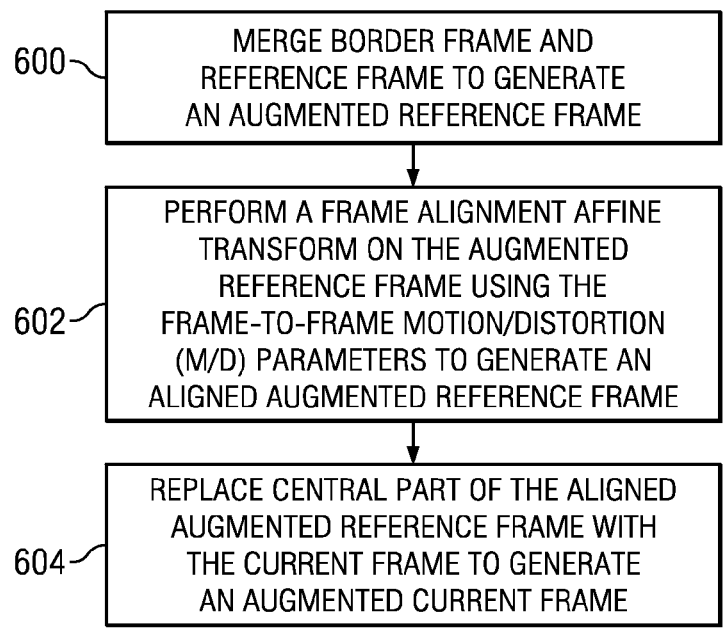

FIG. 6 is a flow graph of a method for augmenting the current frame in accordance with one or more embodiments of the invention. Initially, a border frame and the reference frame are merged to generate an augmented reference frame (600). The border frame is sized such that the reference frame fits exactly in the center of the border frame. Next, a frame alignment affine transformation is performed on the augmented reference frame to align the augmented reference frame with the current frame, resulting in an aligned augmented reference frame (602). The alignment affine transformation is given in Eq. (15) and the parameters values are taken from the frame-to-frame M/D parameter vector $\vec{p}$ generated for the current frame. The central part of the aligned augmented reference frame is then replaced with the current frame to generate an augmented current frame (604). The central part of the aligned augmented referenced frame is the same size as the current frame. The border portion of the augmented current frame, i.e., the portion of the augmented current frame outside the boundaries of the current frame, is also saved to be used as the border frame for the next frame in the video sequence.

The performance of an embodiment of the method of FIG. 5 using augmented frames was evaluated on two representative test videos, Video1 and Video2. The resolution was QVGA (320×240) and the frame rate was 15 fps. Video1 (128 frames) was taken while the camera operator was walking forward and Video2 (101 frames) was taken while the camera operator was walking forward and panning the camera to the left and right.

The Interframe Transformation Fidelity (ITF) metric, which measures the average frame difference between pairs of consecutive frames, was used to objectively evaluate the quality of the method. In addition, certain parts of the method were disabled to create two other versions: (1) translational-only video stabilization (TVS) and (2) translational plus rotational video stabilization (RVS). Table 1 summarizes the ITF values for the original video (cropped to the same size as the other results) and the output videos after TVS, RVS, and the full method.

TABLE 1

| ITF(dB) | Original | TVS | RVS | Full |
| --- | --- | --- | --- | --- |
| video1 | 15.43 | 18.26 | 18.60 | 19.33 |
| video2 | 13.84 | 14.37 | 14.53 | 14.64 |

Embodiments of the methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized programmable accelerators. A stored program in an onboard or external (flash EEP) ROM or FRAM may be used to implement the video signal processing including embodiments of the methods for video stabilization and reduction of rolling shutter distortion described herein. Analog-to-digital converters and digital-to-analog converters provide coupling to the real world, modulators and demodulators (plus antennas for air interfaces) can provide coupling for transmission waveforms, and packetizers can provide formats for transmission over networks such as the Internet.

Embodiments of the methods described herein may be implemented in hardware, software, firmware, or any combination thereof. If implemented at least partially in software, the software may be executed in one or more processors, such as a microprocessor, application specific integrated circuit (ASIC), field programmable gate array (FPGA), or digital signal processor (DSP). The software embodying the methods may be initially stored in a computer-readable medium (e.g., memory, flash memory, a DVD, etc.) and loaded and executed by a processor. Further, the computer-readable medium may be accessed over a network or other communication path for downloading the software. In some cases, the software may also be provided in a computer program product, which includes the computer-readable medium and packaging materials for the computer-readable medium.

Figure 7:
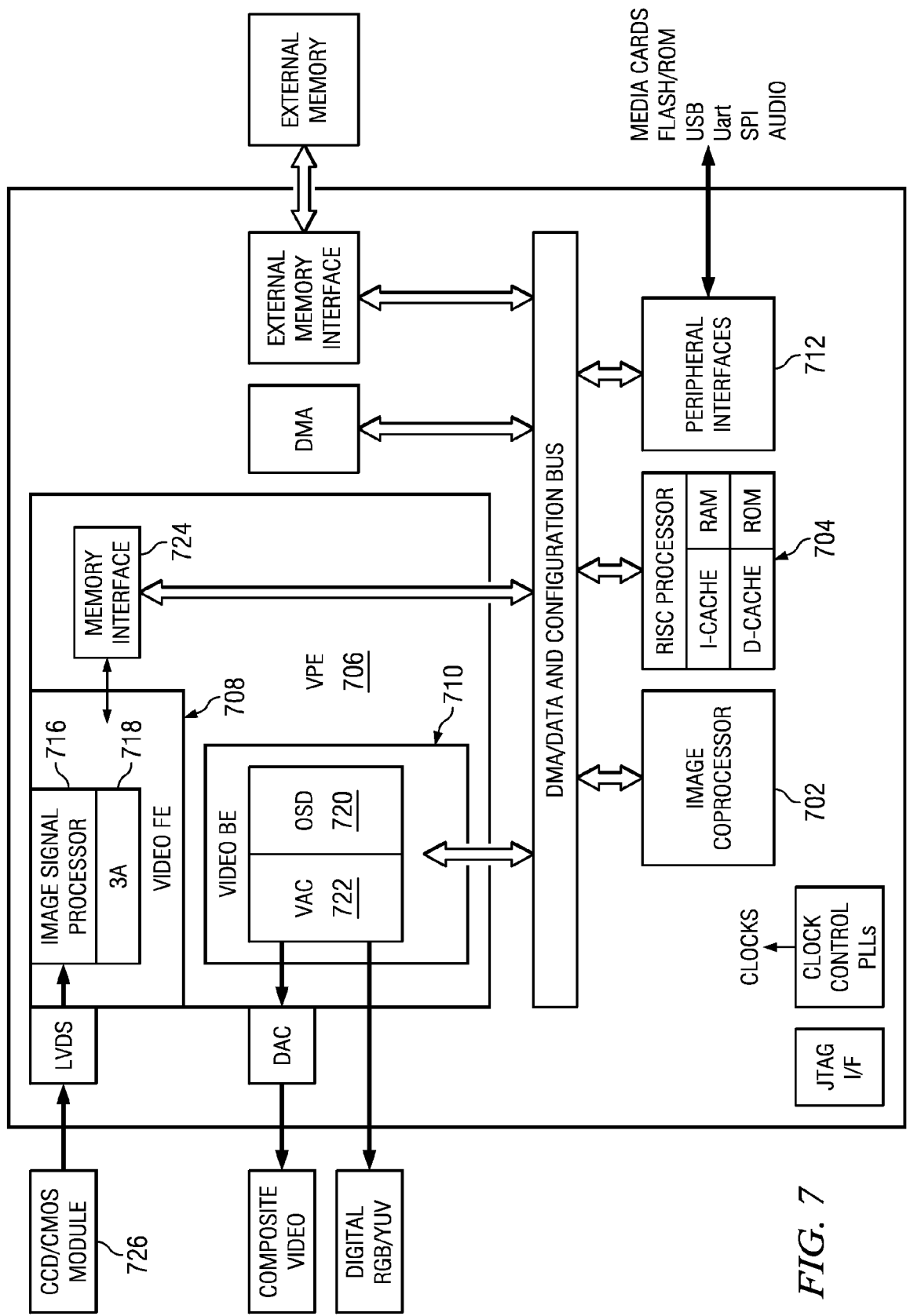
FIGS. 7-9 show illustrative digital systems in accordance with one or more embodiments of the invention.
Figure 8:
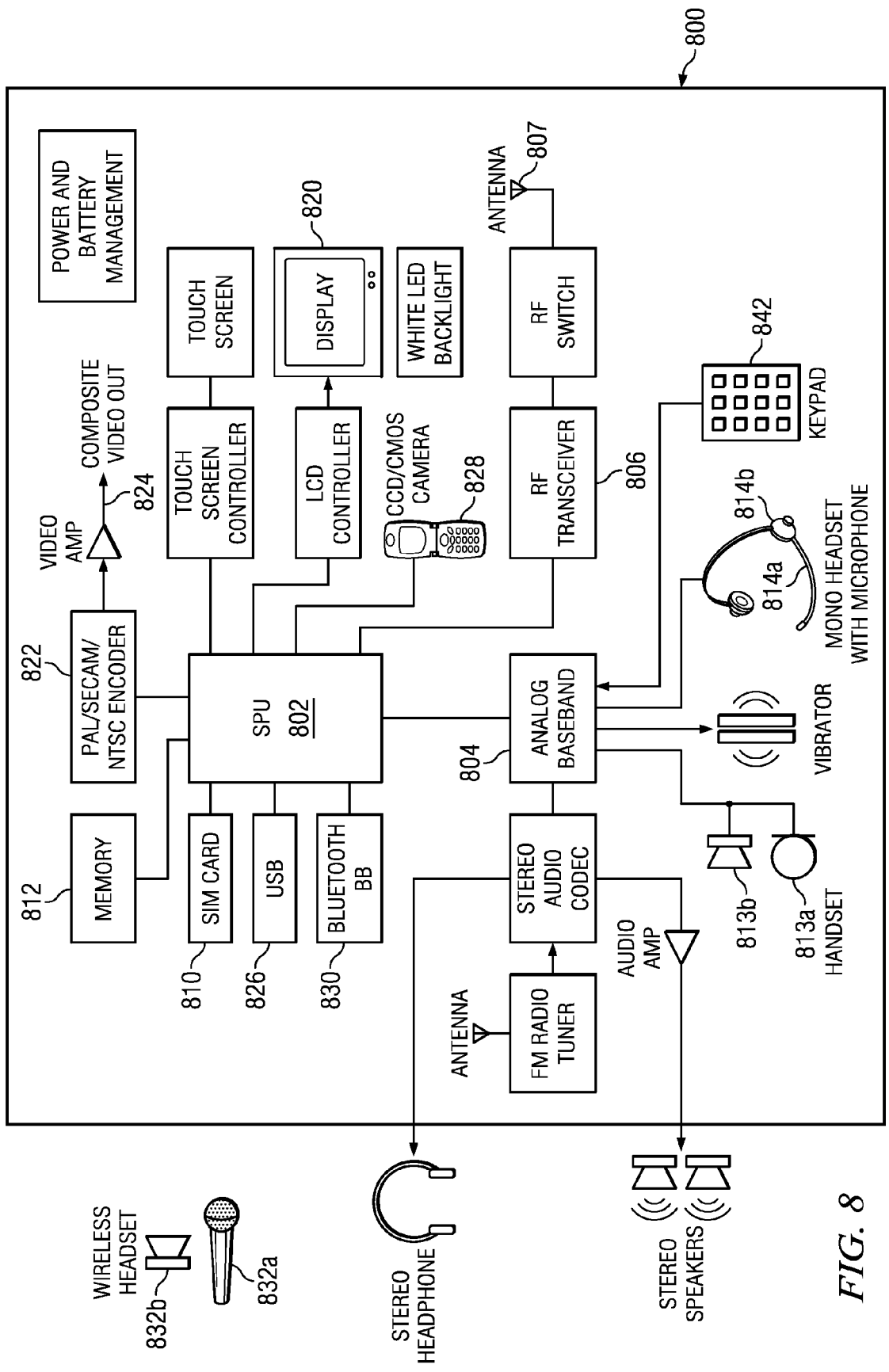
Figure 9:
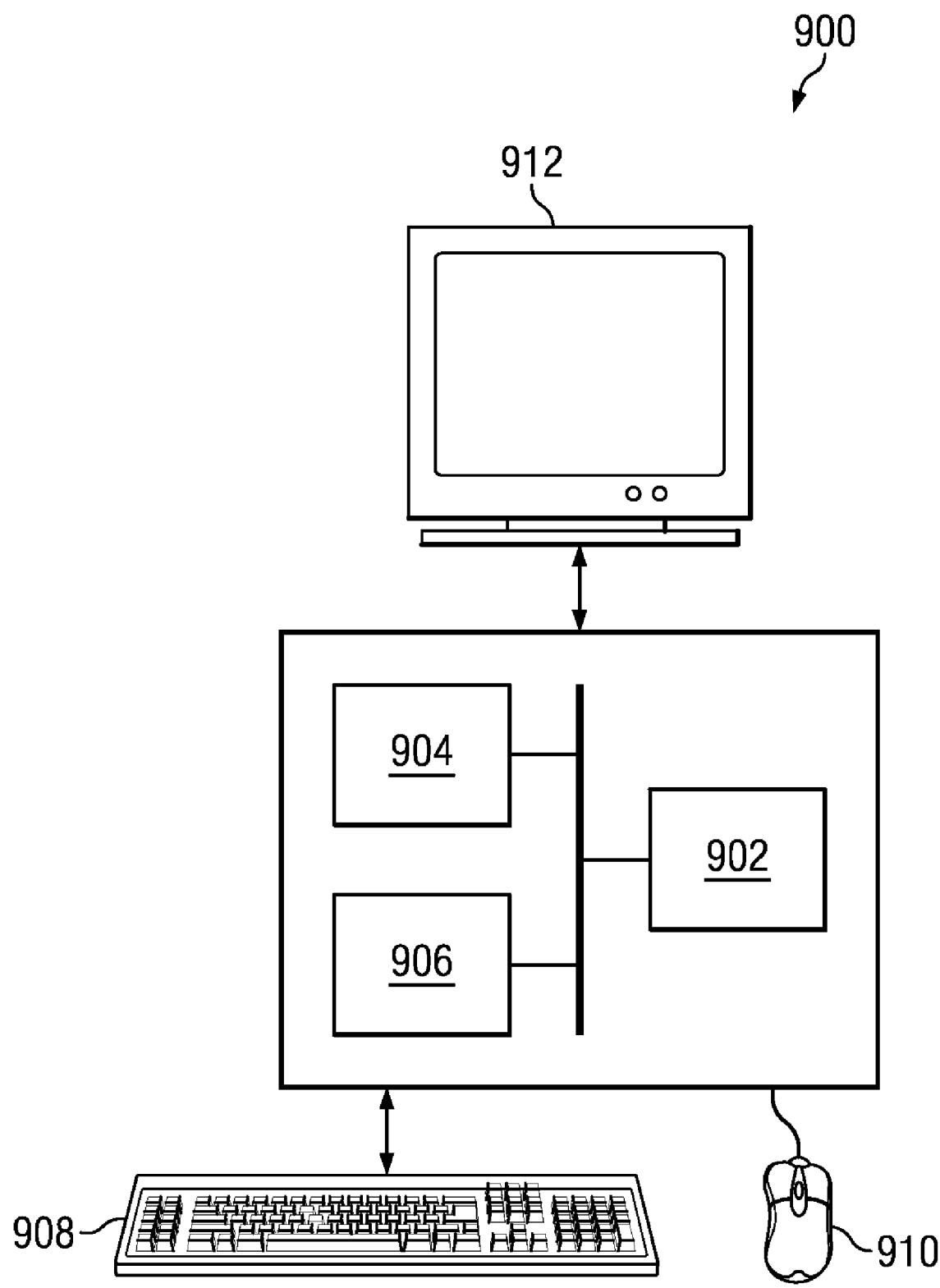

Embodiments of the methods and systems for motion/distortion compensation in a digital video sequence as described herein may be implemented for virtually any type of digital system (e.g., a desk top computer, a laptop computer, a handheld device such as a mobile (i.e., cellular) phone, a personal digital assistant, a digital camera, etc.) with functionality to capture or otherwise generate digital video sequences. FIGS. 7-9 show block diagrams of illustrative digital systems.

FIG. 7 shows a digital system suitable for an embedded system (e.g., a digital camera) in accordance with one or more embodiments of the invention that includes, among other components, a DSP-based image coprocessor (ICP) (702), a RISC processor (704), and a video processing engine (VPE) (706) that may be configured to perform embodiments of methods described herein. The RISC processor (704) may be any suitably configured RISC processor. The VPE (706) includes a configurable video processing front-end (Video FE) (708) input interface used for video capture from imaging peripherals such as image sensors, video decoders, etc., a configurable video processing back-end (Video BE) (710) output interface used for display devices such as SDTV displays, digital LCD panels, HDTV video encoders, etc, and memory interface (724) shared by the Video FE (708) and the Video BE (710). The digital system also includes peripheral interfaces (712) for various peripherals that may include a multi-media card, an audio serial port, a Universal Serial Bus (USB) controller, a serial port interface, etc.

The Video FE (708) includes an image signal processor (ISP) (716), and a 3A statistic generator (3A) (718). The ISP (716) provides an interface to image sensors and digital video sources. More specifically, the ISP (716) may accept raw image/video data from a sensor module (726) (e.g., CMOS or CCD) and can accept YUV video data in numerous formats. The ISP (716) also includes a parameterized image processing module with functionality to generate image data in a color format (e.g., RGB) from raw CCD/CMOS data. The ISP (716) is customizable for each sensor type and supports video frame rates for preview displays of captured digital images and for video recording modes. The ISP (716) also includes, among other functionality, an image resizer, statistics collection functionality, and a boundary signal calculator. The 3A module (718) includes functionality to support control loops for auto focus, auto white balance, and auto exposure by collecting metrics on the raw image data from the ISP (716) or external memory. In one or more embodiments of the invention, the Video FE (708) is configured to perform a method for motion/distortion compensation as described herein.

The Video BE (710) includes an on-screen display engine (OSD) (720) and a video analog encoder (VAC) (722). The OSD engine (720) includes functionality to manage display data in various formats for several different types of hardware display windows and it also handles gathering and blending of video data and display/bitmap data into a single display window before providing the data to the VAC (722) in a color space format (e.g., RGB, YUV, YCbCr). The VAC (722) includes functionality to take the display frame from the OSD engine (720) and format it into the desired output format and output signals required to interface to display devices. The VAC (722) may interface to composite NTSC/PAL video devices, S-Video devices, digital LCD devices, high-definition video encoders, DVI/HDMI devices, etc.

The memory interface (724) functions as the primary source and sink to modules in the Video FE (708) and the Video BE (710) that are requesting and/or transferring data to/from external memory. The memory interface (724) includes read and write buffers and arbitration logic.

The ICP (702) includes functionality to perform the computational operations required for compression and other processing of captured images. The video compression standards supported may include, for example, one or more of the JPEG standards, the MPEG standards, and the H.26x standards. In one or more embodiments of the invention, the ICP (702) may be configured to perform computational operations of a motion/distortion compensation method as described herein.

In operation, to capture a photograph or video sequence, video signals are received by the video FE (708) and converted to the input format needed to perform video compression. Prior to the compression, a method for motion/distortion compensation as described herein may be applied as part of processing the captured video data. The video data generated by the video FE (708) is stored in the external memory. The video data is then encoded, i.e., compressed. During the compression process, the video data is read from the external memory and the compression computations on this video data are performed by the ICP (702). The resulting compressed video data is stored in the external memory. The compressed video data is then read from the external memory, decoded, and post-processed by the video BE (710) to display the image/video sequence.

FIG. 8 is a block diagram of a digital system (e.g., a mobile cellular telephone) (800) that may be configured to perform a motion/distortion compensation method as described herein. The signal processing unit (SPU) (802) includes a digital signal processing system (DSP) that includes embedded memory and security features. The analog baseband unit (804) receives a voice data stream from the handset microphone (813*a*) and sends a voice data stream to the handset mono speaker (813*b*). The analog baseband unit (804) also receives a voice data stream from the microphone (814*a*) and sends a voice data stream to the mono headset (814*b*). The analog baseband unit (804) and the SPU (802) may be separate ICs. In many embodiments, the analog baseband unit (804) does not embed a programmable processor core, but performs processing based on configuration of audio paths, filters, gains, etc being setup by software running on the SPU (802). The display (820) may also display pictures and video streams received from the network, from a local camera (828), or from other sources such as the USB (826) or the memory (812). The SPU (802) may also send a video stream to the display (820) that is received from various sources such as the cellular network via the RF transceiver (806) or the camera (828). The SPU (802) may also send a video stream to an external video display unit via the encoder (822) over a composite output terminal (824). The encoder unit (822) may provide encoding according to PAL/SECAM/NTSC video standards.

The SPU (802) includes functionality to perform the computational operations required for video encoding and decoding. The video encoding standards supported may include, for example, one or more of the JPEG standards, the MPEG standards, and the H.26x standards. In one or more embodiments of the invention, the SPU (802) is configured to perform the computational operations of a motion/distortion compensation method as described herein. Software instructions implementing the method may be stored in the memory (812) and executed by the SPU (802) as part of capturing and/or encoding of digital image data, e.g., pictures and video streams.

FIG. 9 shows a digital system (900) (e.g., a personal computer) that includes a processor (902), associated memory (904), a storage device (906), and numerous other elements and functionalities typical of digital systems (not shown). In one or more embodiments of the invention, a digital system may include multiple processors and/or one or more of the processors may be digital signal processors. The digital system (900) may also include input means, such as a keyboard (908) and a mouse (910) (or other cursor control device), and output means, such as a monitor (912) (or other display device). The digital system (900) may also include an image capture device (not shown) that includes circuitry (e.g., optics, a sensor, readout electronics) for capturing video sequences. The digital system (900) may include functionality to perform a motion/distortion compensation method as described herein. The digital system (900) may be connected to a network (914) (e.g., a local area network (LAN), a wide area network (WAN) such as the Internet, a cellular network, any other similar type of network and/or any combination thereof) via a network interface connection (not shown). Those skilled in the art will appreciate that the input and output means may take other forms.

Further, those skilled in the art will appreciate that one or more elements of the aforementioned digital system (900) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. It is therefore contemplated that the appended claims will cover any such modifications of the embodiments as fall within the true scope and spirit of the invention.

What is claimed is:

1. A method of processing a digital video sequence, the method comprising:
   estimating compensated motion parameters and compensated distortion parameters (compensated M/D parameters) of a compensated motion/distortion (M/D) affine transformation for a block of pixels in the digital video sequence; and
   applying the compensated M/D affine transformation to the block of pixels using the estimated compensated M/D parameters to generate an output block of pixels, wherein translational and rotational jitter in the block of pixels is stabilized in the output block of pixels and distortion due to skew, horizontal scaling, vertical scaling, and wobble in the block of pixels is reduced in the output block of pixels, wherein the compensated M/D affine transformation is defined as $$\begin{bmatrix} x' \\ y' \end{bmatrix} = \begin{bmatrix} 1+s_x^c & -\theta^c + k^c \\ \theta^c & 1+s_y^c \end{bmatrix} \begin{bmatrix} x \\ y \end{bmatrix} + \begin{bmatrix} d_x^c \\ d_y^c \end{bmatrix}$$

wherein $d_x^c$, $d_y^c$, and $\theta^c$ are the compensated motion parameters, $s_x^c$, $s_y^c$, and $k^c$ are the compensated distortion parameters, $$\begin{bmatrix} x' \\ y' \end{bmatrix}$$

are coordinates of a pixel in the block of pixels, and $$\begin{bmatrix} x \\ y \end{bmatrix}$$

are coordinates of a pixel in the output block of pixels.

2. The method of claim 1, wherein estimating compensated motion parameters and compensated distortion parameters comprises:
   estimating block-to-block motion parameters and block-to-block distortion parameters (block-to-block M/D parameters) between the block of pixels and a reference block of pixels;
   estimating first intentional block-to-block motion parameters and first intentional block-to-block distortion parameters (first intentional block-to-block M/D parameters) between the block of pixels and the reference block of pixels using the block-to-block M/D parameters and second intentional block-to-block M/D parameters estimated for the reference block of pixels; and
   estimating the compensated M/D parameters using the block-to-block M/D parameters and the first intentional block-to-block M/D parameters.

3. The method of claim 2, wherein estimating block-to-block M/D parameters comprises computing a solution for $$\underbrace{\begin{bmatrix} 1 & 0 & -y & x & 0 & y \\ 0 & 1 & x & 0 & y & 0 \end{bmatrix}}_{M} \underbrace{\begin{bmatrix} d_x \\ d_y \\ \theta \\ s_x \\ s_y \\ k \end{bmatrix}}_{\vec{p}} = \underbrace{\begin{bmatrix} x'-x \\ y'-y \end{bmatrix}}_{\vec{v}}$$

wherein x and y are coordinates of a pixel in a feature selected from the reference block of
pixels, x' and y' are coordinates of a pixel in the block of pixels, $d_x$, $d_y$, and $\theta$ are the motion parameters, and $s_x$, $s_y$, and k are the distortion parameters.

4. The method of claim 2, wherein estimating intentional block-to-block M/D parameters comprises:
   estimating first low-pass block-to-block motion parameters and first low-pass block-to-block distortion parameters (first low-pass block-to-block M/D parameters) between the block of pixels and the reference block of pixels using a low-pass filter, the block-to-block M/D parameters, and second low-pass block-to-block M/D parameters estimated for the reference block of pixels; and
   using the first low-pass block-to-block M/D parameters to estimate the first intentional block-to-block M/D parameters.

5. The method of claim 4, wherein using a low-pass filter comprises applying a vector of damping factors to the block-to-block M/D parameters and the second low-pass block-to-block M/D parameters.

6. The method of claim 4, wherein using a low-pass filter comprises applying an adaptive damping vector $\vec{\beta}[n]$ to the block-to-block M/D parameters and the second intentional block-to-block M/D parameters, wherein the adaptive damping vector $\vec{\beta}[n]$ is computed as $$\vec{\beta}[n] = \max(\vec{\beta}_0 - \vec{\rho} \cdot |\vec{p}^L[n]|, 0)$$

wherein $\vec{\beta}_0$ is a vector of maximum damping factor values, $\vec{\rho}$ is a vector of parameters that control strength of adaptation, n is a number of the block of pixels, and $\vec{p}^L[n]$ is a vector of the first low-pass block-to-block M/D parameters.

7. The method of claim 2, wherein estimating the compensated M/D parameters comprises:
estimating first wobble compensation parameters between the block of pixels and the reference block of pixels using the block-to-block M/D parameters, the first intentional block-to-block M/D parameters, and second wobble compensation parameters estimated for the reference block of pixels;
estimating skew and vertical scaling distortion parameters between the block of pixels and the reference block of pixels; and
computing the compensated M/D parameters as the sum of the first wobble compensation parameters and the skew and vertical scaling distortion parameters.

8. The method of claim 1, wherein the output block of pixels is cropped to removed invalid regions.

9. The method of claim 1, wherein the block of pixels is augmented with a border of pixels prior to applying the compensated M/D affine transformation.

10. The method of claim 1, wherein the output block of pixels is a same size as the block of pixels.

11. A digital system for processing a digital video sequence, the digital system comprising:
a memory configured to store a block of pixels of the video sequence and a reference block of pixels of the video sequence; and
a video stabilization component configured to
estimate compensated motion parameters and compensated distortion parameters (M/D parameters) of a motion/distortion (M/D) affine transformation for the block of pixels; and
apply the compensated M/D affine transformation to the block of pixels using the estimated compensated M/D parameters to generate an output block of pixels, wherein translational and rotational jitter in the block of pixels is stabilized in the output block of pixels and distortion due to skew, horizontal scaling, vertical scaling, and wobble in the block of pixels is reduced in the output block of pixels, wherein the memory is further configured to store a border block of pixels and wherein the video stabilization component is further configured to augment the block of pixels with the border block of pixels prior to applying the compensated M/D affine transformation.

12. The digital system of claim 11, wherein the video stabilization component comprises an M/D compensation affine transform component configured to apply the compensated M/D affine transformation, wherein the compensated M/D affine transformation is defined as $$\begin{bmatrix} x' \\ y' \end{bmatrix} = \begin{bmatrix} 1+s_x^c & -\theta^c + k^c \\ \theta^c & 1+s_y^c \end{bmatrix} \begin{bmatrix} x \\ y \end{bmatrix} + \begin{bmatrix} d_x^c \\ d_y^c \end{bmatrix}$$

wherein $d_x^c$, $d_y^c$, and $\theta^c$ are the compensated motion parameters, $s_x^c$, $s_y^c$, and $k^c$ are the compensated distortion parameters, $$\begin{bmatrix} x' \\ y' \end{bmatrix}$$

are coordinates of a pixel in the block of pixels, and $$\begin{bmatrix} x \\ y \end{bmatrix}$$

are coordinates of a pixel in the output block of pixels.

13. The digital system of claim 12, wherein the video stabilization component comprises:
a block-to-block M/D estimation component configured to estimate block-to-block motion parameters and block-to-block distortion parameters (block-to-block M/D parameters) between the block of pixels and a reference block of pixels;
an intentional M/D estimation component configured to estimate first intentional block-to-block motion parameters and first intentional block-to-block distortion parameters (first intentional block-to-block M/D parameters) between the block of pixels and the reference block of pixels using the block-to-block M/D parameters and second intentional block-to-block M/D parameters estimated for the reference block of pixels; and
a compensated M/D estimation component configured to estimate the compensated M/D parameters using the block-to-block M/D parameters and the first intentional block-to-block M/D parameters.

14. The digital system of claim 13, wherein the intentional M/D estimation component is configured to estimate first intentional block-to-block M/D parameters by
estimating first low-pass block-to-block motion parameters and first low-pass block-to-block distortion parameters (first low-pass block-to-block M/D parameters) between the block of pixels and the reference block of pixels using a low-pass filter, the block-to-block M/D parameters, and second low-pass block-to-block M/D parameters estimated for the reference block of pixels; and
using the first low-pass block-to-block M/D parameters to estimate the first intentional block-to-block M/D parameters.

15. The digital system of claim 14, wherein using a low-pass filter comprises applying a vector of damping factors to the block-to-block M/D parameters and the second low-pass block-to-block M/D parameters.

16. The digital system of claim 13, wherein using a low-pass filter comprises applying an adaptive damping vector $\vec{\beta}[n]$ to the block-to-block M/D parameters and the second intentional block-to-block M/D parameters, wherein the adaptive damping vector $\vec{\beta}[n]$ is computed as $$\vec{\beta}[n] = \max(\vec{\beta}_0 - \vec{\rho} \cdot |\vec{p}^L[n]|, 0)$$

wherein $\vec{\beta}_0$ is a vector of maximum damping factor values, $\vec{\rho}$ is a vector of parameters that control strength of adaptation, n is a number of the block of pixels, and $\vec{p}^L[n]$ is a vector of the first low-pass block-to-block M/D parameters.

17. The digital system of claim 13, wherein the compensated M/D estimation component is configured to estimate the compensated M/D parameters by
estimating first wobble compensation parameters between the block of pixels and the reference block of pixels using the block-to-block M/D parameters, the first intentional block-to-block M/D parameters, and second wobble compensation parameters estimated for the reference block of pixels;
estimating skew and vertical scaling distortion parameters between the block of pixels and the reference block of pixels; and
computing the compensated M/D parameters as the sum of the first wobble compensation parameters and the skew and vertical scaling distortion parameters.

18. A non-transitory computer readable medium storing software instructions that, when executed by a processor of a digital system, cause the digital system to perform a method of processing a digital video sequence, the method comprising:

estimating compensated motion parameters and compensated distortion parameters (M/D parameters) of a motion/distortion (M/D) affine transformation for a block of pixels in the digital video sequence; and applying the M/D affine transformation to the block of pixels using the estimated compensated M/D parameters to generate an output block of pixels, wherein translational and rotational jitter in the block of pixels is stabilized in the output block of pixels and distortion due to skew, horizontal scaling, vertical scaling, and wobble in the block of pixels is reduced in the output block of pixels, wherein the compensated M/D affine transformation is defined as $$\begin{bmatrix} x' \\ y' \end{bmatrix} = \begin{bmatrix} 1+s_x^c & -\theta^c+k^c \\ \theta^c & 1+s_y^c \end{bmatrix} \begin{bmatrix} x \\ y \end{bmatrix} + \begin{bmatrix} d_x^c \\ d_y^c \end{bmatrix}$$

wherein $d_x^c$, $d_y^c$, and $\theta^c$ are the compensated motion parameters, $s_x^c$, $s_y^c$, and $k^c$ are the compensated distortion parameters, $$\begin{bmatrix} x' \\ y' \end{bmatrix}$$

are coordinates of a pixel in the block of pixels, and $$\begin{bmatrix} x \\ y \end{bmatrix}$$

are coordinates of a pixel in the output block of pixels.

\* \* \* \* \*